Patented Dec. 6, 1938

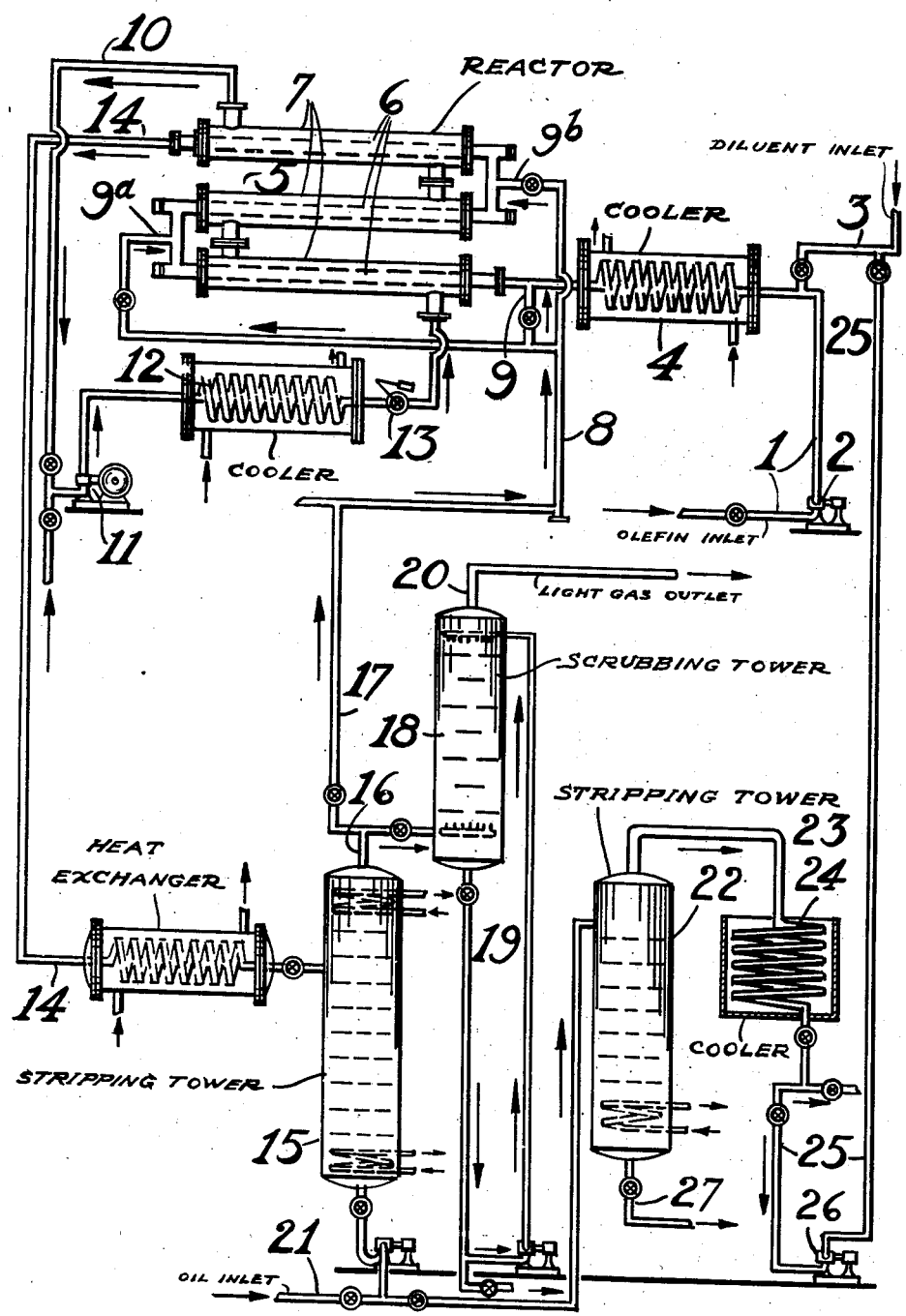

2,139,038

UNITED STATES PATENT OFFICE 2,139,038

PROCESS FOR PRODUCING POLYMERS OF OLEFINES

Robert P. Russell, Short Hills, N. J., assignor to Standard Oil Development Company, a corporation of Delaware Application February 7, 1935, Serial No. 5,396

13 Claims. (Cl. 260—2)

The present invention relates to the art of producing valuable polymers and more specifically to an improved continuous method for producing hydrocarbon polymers from gaseous olefines, especially isobutylene. The invention will be fully understood from the following description and the drawing:

The drawing represents in semi-diagrammatic form an apparatus for polymerizing gaseous olefines, especially isobutylene.

Referring to the drawing, numeral 1 designates a pipe through which the material to be polymerized is passed by a pump 2. This material which will be described more fully below will be denoted as isobutylene during the description of the drawing, although it will be understood that other materials may be used. The normally gaseous material is used in a liquid state and a diluent, the nature of which will also be disclosed below, is forced into pipe 1 by means of pipe 3. The mixture passes through a cooling coil 4 and into the polymerizing vessel generally indicated at 5. Various types of polymerizing vessels may be used through which the materials pass, but it is preferred to use relatively narrow tubes such as 6, which is surrounded by a cooling jacket 7. A double pipe coil, as shown in the drawing, is quite satisfactory.

A catalytic agent which may be exemplified as boron fluoride or any known equivalent therefor is passed by a feed pipe 8 so as to mix with the material to be polymerized before entering the reaction chamber. It is introduced at the point 9 or at several different points such as 9$^a$ and 9$^b$.

The jacket 7 is maintained at a low temperature, below about —20° C. by a refrigerant, which is circulated through a pipe 10, compressor 11, cooler 12 and the pressure reduction valve 13. The refrigerant is therefore kept out of direct contact with the materials undergoing reaction. Hydrocarbon gases such as ethane or ethylene or propane, propylene or mixtures thereof are preferred as refrigerants, but ammonia or sulfur dioxide or methyl chloride, or in fact any other refrigerant may be used which is capable of producing the low temperatures mentioned above.

The polymerized mass and diluent passes from the reactor or polymerizing vessel by means of a pipe 14 and if a sufficient quantity of diluent and suitable velocity is employed, there is no need for scrapers or conveyors within the narrow tubes 6 although these may be supplied if desired. After passing through the heat exchanger or heater 14 the diluted polymer is conducted to the recovery apparatus.

Recovery may be accomplished in any means desired when it is preferable to first remove the catalyst. If boron fluoride is the catalyst used, recovery may be accomplished by passing the diluted polymer through a stripping tower 15 from which the boron fluoride leaves by a pipe 16. The boron fluoride may be returned directly for reuse, if it is present in sufficiently high concentration, by means of pipe 17 or it may be passed through a scrubbing tower 18 where it or its decomposition products are absorbed in a suitable liquid such as caustic soda which is circulated through a pipe 19. Light gaseous hydrocarbons which may be present are removed by the pipe 20.

The heavy polymer diluent mixture flows from the base of the tower 15 and to it may be added an oil supplied by pipe 21. This may, for example, be a naphtha or gas oil or a lubricating oil and the mixture is then pumped into a diluent stripping tower 22. From this the diluent together with isobutylene which has not been polymerized is taken overhead by a pipe 23 condensed in the cooler 24 and returned for reuse by a pipe 25 and pump 26. The oil containing the polymer is drawn off from the base of the tower by means of the pipe 27 and may be conducted to storage or wherever desired.

The materials to be polymerized comprise olefines, especially those which are normally gaseous and particularly isobutylene or mixtures rich in the same, for example, cracked gases or light fractions from cracked oils such as the butane-butylenes cut which is ordinarily obtained as a by-product on stabilizing the cracked naphtha. Such a cut ordinarily contains 10 to 15% of isobutylene and can be used to produce high molecular weight polymers but lower temperatures are required than in cases where a greater proportion of isobutylene is used. For this reason it is preferable to enrich with isobutylene derived from other sources. It is desirable in the practice of the present invention to provide a source of pollymerizing material in which, say 10 to 50% of isobutylene is present in order to get high molecular weight polymers at reasonable temperatures, such as —40 to —100° C.

As for the diluent, it is preferred to use diluents such as fractions with more than three carbon atoms. It sometimes happens that the isobutylene fraction contains a sufficient amount of butane and higher saturated hydrocarbons to serve, but it is preferred to add additional quantities of propane, butane or pentane in which the polymer is freely soluble under reaction conditions. Mixtures such as light naphthas may, of course, be used. By increasing the amount of isobutylene and the butane or other saturated diluent, the amount of other olefines is decreased, which is desirable.

As the catalyst boron fluoride is perhaps the most desirable, since it is very active and being a gas, is readily separated from the polymerized product, but other equivalent materials such as titanium tetrachloride or tetrabromide or aluminum chloride or other catalysts of the type generally known as the "active halide catalysts" may be employed. The amount of the catalyst used may vary considerably with other factors such as the concentration of olefines, the temperature of polymerization and the nature of the polymer desired, but in general, it has been found desirable to use very small amounts, for example as little as .003% by weight based on the feed containing from 20 to 25% isobutylene. It is advantageous to use small amounts of catalyst, irrespective of cost because if the amount of catalyst is greatly increased, the reaction becomes too rapid and it is difficult to control temperature. An amount of catalyst up to 1.0% by weight of the feed is satisfactory.

The reaction conditions employed are, generally speaking, those which induce linear or chain type polymerization in contradistinction to the ring formation or branchiness. For this purpose, the reaction is conducted in liquid phase and at a temperature below about −20° C. The temperatures may be much lower, for example, at −40 or −80 or even at −100° C. In general, the lower the temperature and the purer the isoolefines, the higher will be the molecular weight of the polymers. Such polymers range from viscous oils to plastic solids. They may be produced in a colorless condition and are freely soluble in naphthas and other normally liquid hydrocarbons in all proportions causing a considerable increase in all proportions causing a considerable increase in viscosity, and, especially in the case of isobutylene polymers, a great increase of viscosity index.

A pressure in excess of atmospheric may be used during the reaction and the rate of flow through the tubes is such as to prevent evaporation of the diluent within the reaction tubes and to prevent stoppage by settling or deposition of the polymer on the walls of the vessel. The diluent is also of great assistance in permitting rapid flow through the tubes. A velocity of ½ foot per second or higher has been successfully employed. The amount of diluent should be sufficient to maintain the polymer which is formed in a free flowing fluid condition and, as indicated before, it is preferred to have 3 to 4 or more pounds of diluent per pound of polymer in producing polymers of the type and quality best suited for thickening lubricating oils. It is important to produce a free flowing mixture of the polymer in order to obtain a rapid transfer of heat from the reaction vessel and to maintain the low temperatures required. The polymer is preferably completely dissolved, but it is only necessary that the mixture be free flowing and, although some of the polymer may be in a suspended rather than a completely dissolved condition, it is found still to be free flowing.

The time of contact is also of importance, but the reaction is very rapid and the best method of adjusting the time of contact is by controlling the rate of flow and the length of the polymerizing tubes. Suitable time of contact will be illustrated in the example given below, but generally it is complete at 3 to 5 minutes of contact.

The process is subject to control by adjustment of the amount of catalyst, the time and temperature as well as the concentration of the polymerizing material. It is found desirable to use externally cooled tubes as described and the temperature may be readily controlled by this means quite independently of the amount of diluent and the transference of heat is found to be adequate where enough diluent is employed to produce a free flowing polymer solution. Temperature may be readily adjusted to obtain any particular grade of the polymer, say from a viscous liquid to plastic solids of high molecular weight. This may be done even more accurately than might be expected from the above statement, for example, in spite of slight changes in the olefine composition, which is difficult to control, and other factors, by constant temperature adjustment, it is possible to produce polymers of closely reproducible thickening power.

The recovery of the polymer may be accomplished as described by steaming off the unconverted gaseous hydrocarbons and the catalyst, and distilling off the diluent. The polymer itself may be heated to about 350° F. for ten or fifteen hours without breakdown. It is preferable, however, to first remove the catalyst if it be gaseous like boron fluoride and either recirculate it if sufficiently concentrated, or recover it, as described. The less volatile catalysts may be removed by hydrolyzing with acid or alkaline solutions or water alone. It is then preferred to distill off the diluent and to add a heavy oil such as lubricating oil to take up the polymer, since that is the form in which it is preferably marketed. The addition of the heavy oil may be prior, during, or after the distillation of the diluent.

The present process and its method of operation will be fully understood from the following examples:

Example I

The polymerizing chamber was a continuous 125-foot length of .173 inch inside diameter copper tubing and was cooled by immersion in a bath of alcohol and solid carbon dioxide, the composition of which was adjusted to maintain a temperature of −55° C. The feed stock was a mixture of butane and butylenes containing 28% of isobutylene.

The feed stock was passed at a rate which was varied from 33 to 65 grams per minute through the coil and boron fluoride was added in a gaseous state at a rate held within the limits of .5 to 1.0 gram per 100 grams of isobutylene.

The total time of contact varied from 5 to 10 minutes and the reaction mixture was run into alcohol which removed the boron fluoride. The yield and quality of the polymer varied slightly with the feed rate, the longer time of contact giving the greater yield, but it did not change very greatly and averaged about 33% on the total butane-butylene cut. This material had an average tetrahydronaphthalene number of 4.14, which is an index of the thickening power of the polymer, and represents the viscosity of a solution containing 2.8% by weight of the polymer in tetrahydronaphthalene relative to pure water. This viscosity is measured at a temperature of 20° C.

The polymer was a clear white viscous mass which was completely soluble in the butane-butylene diluent and emerged from the tube in a free flowing condition.

For producing higher tetrahydronaphthalene number polymers a larger diameter tube is recommended. It is desirable to use lower temperatures to make such polymers but they can be made without difficulty in a continuous coil system.

Example II

In a second series of tests similar apparatus was used except that the coil length was 200 feet of ¼" pressure tubing. The feed contained 22.3% isobutylene and the time of contact and amount of boron fluoride catalyst were raised to show their effect on yield and quality of polymer. Temperature was carefully controlled and recorded.

| Catalyst percent BF₃ by weight | Contact time | Temperature average at three points | Yield | Tetrahydronaphthalene number |
|---|---|---|---|---|
| | Minutes | °C. | Percent | |
| .005 | 1.0 | −70 | 10.0 | 6.82 |
| .010 | 3.5 | −69.7 | 19.2 | 5.76 |

In the last run the yield is close to the theoretical.

The polymers made by this method, whether of the higher or lower molecular weight are equally as good in every respect as those produced in batch and it is believed that by this continuous method it is possible to produce more uniform products.

I claim:

1. An improved process for producing linear polymers of high molecular weight from olefines or mixtures rich in the same, comprising passing a liquefied mixture of cracked hydrocarbons of the butane-butylene range including iso-butylene and a substantially unpolymerizable hydrocarbon diluent through a reaction zone in a narrow confined stream along with a boron fluoride catalyst supplied at a plurality of different points along the reaction zone, the initial mixture containing at least a substantial proportion of the total amount of the catalyst necessary to complete the reaction, maintaining a temperature below −20° C. by indirect cooling, providing sufficient time for polymerization of the olefine to a product ranging from a viscous liquid to a solid and withdrawing a mixture of said polymer and the liquid diluent in a free flowing condition.

2. An improved process for polymerizing the olefines, comprising passing a readily polymerizable normally gaseous iso-olefine and an unpolymerizable diluent rapidly through a long narrow tube of not substantially greater than ¼ inch in diameter along with a polymerizing catalyst of the metal and metalloid halide type having polymerization-promoting properties substantially similar to those of boron fluoride, the initial mixture containing at least a substantial proportion of the total amount of the catalyst necessary to complete the reaction, maintaining a temperature below −20° C. in the zone by indirect contact with a refrigerant and removing the polymer and the diluent in a free flowing condition and having the time of contact between said catalyst and olefine of less than ten minutes duration.

3. A continuous process for producing high molecular weight viscous liquid to solid linear hydrocarbon polymers which comprises continuously passing a mixture of a readily polymerizable normally gaseous iso-olefine and a substantially unpolymerizable hydrocarbon diluent in liquid phase, together with a small amount of polymerization catalyst of the active metal and metalloid halide type such as boron fluoride, aluminum chloride, titanium tetrachloride and the like, rapidly through a narrow reaction zone at a linear velocity of at least ½ ft. per second, at a temperature maintained below −20° C. by indirect cooling, using a sufficient amount of diluent to maintain the resultant polymer in a free-flowing condition and having the velocity of flow so adjusted in relation to the dimensions of the reaction zone that the time of contact is not substantially more than about 10 minutes, and finally separating the catalyst from the polymerized product.

4. Process according to claim 3, in which the polymerizable iso-olefine used is isobutylene.

5. Process according to claim 3, carried out under temperature and pressure conditions under which the polymerizable iso-olefine is in a liquid phase.

6. A continuous process for producing high molecular weight linear hydrocarbon polymers having a tetralin number of at least about 4, based upon the viscosity of a 2.8% solution thereof intetrahydronaphthalene at 20° C. relative to pure water, which comprises continuously passing a mixture of isobutylene and a substantially unpolymerizable hydrocarbon liquid diluent in liquid phase, together with a small amount of polymerization catalyst of the active metal and metalloid halide type such as boron fluoride, aluminum chloride, titanium tetrachloride and the like, rapidly through a narrow reaction zone at a linear velocity of at least ½ ft. per second, at a temperature maintained below −20° C. by indirect cooling, using a sufficient amount of diluent to maintain the resultant polyisobutylene in a free-flowing condition and having the velocity of flow so adjusted in relation to the dimensions of the reaction zone that the time of contact is not substantially more than about 10 minutes, and finally separating the catalyst from the polyisobutylene.

7. Process according to claim 6 in which 1 to 10 parts by weight of diluent are used for every one part by weight of isobutylene.

8. Process according to claim 6 in which the diluent used contains more than 3 carbon atoms.

9. Process according to claim 6 in which the reaction zone comprises one or more tubes not substantially greater than ¼ inch in diameter.

10. Process according to claim 6 in which .003%–1.0% by weight of catalyst is used, based on the raw material feed.

11. A continuous process for producing high molecular weight viscous liquid to solid linear hydrocarbon polymers having a tetralin number of at least about 4, based upon the viscosity of a 2.8% solution thereof in tetrahydronaphthalene at 20° C. relative to pure water, which comprises continuously passing a mixture in liquid phase of 1 part by weight of isobutylene and from 1 to 10 parts by weight of an unpolymerizable hydrocarbon diluent consisting essentially of hydrocarbons having more than 3 carbon atoms, together with about .003%–1.0% of boron fluoride, based on the weight of the hydrocarbon feed, rapidly through a reaction zone in the shape of long narrow tubes, at a linear velocity of at least ½ ft. per second at a temperature maintained below −20° C. by indirect cooling with a liquid refrigerant, using a sufficient amount of diluent to maintain the resultant polymerized product in a free-flowing condition and having the velocity of flow so adjusted in relation to the dimensions of the reaction zone tubes that the time of contact is not substantially more than about 10 minutes, and finally separating the catalyst from the polymerized product.

12. Process according to claim 11 in which the mixture to be polymerized contains isobutylene in amounts of the order of 10 to 35% by weight.

13. Process according to claim 11 in which the diluent consists essentially of substantially saturated hydrocarbons selected from the group consisting of butane, pentane, and light naphthas.

ROBERT P. RUSSELL.